United States Patent
Sapena Soler

(10) Patent No.: US 11,750,592 B2
(45) Date of Patent: *Sep. 5, 2023

(54) PLATFORM AND METHOD OF CERTIFICATION OF AN ELECTRONIC NOTICE FOR ELECTRONIC IDENTIFICATION AND TRUST SERVICES (EIDAS)

(71) Applicant: LLEIDANETWORKS SERVEIS TELEMATICS, S.A., Lleida (ES)

(72) Inventor: Francisco Sapena Soler, Lleida (ES)

(73) Assignee: LLEIDANETWORKS SERVEIS TELEMATICS, S.A., Lleida (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,882

(22) Filed: Dec. 21, 2020

(65) Prior Publication Data
US 2021/0112051 A1   Apr. 15, 2021

Related U.S. Application Data

(63) Continuation of application No. 15/944,230, filed on Apr. 3, 2018, now Pat. No. 10,938,802.

(30) Foreign Application Priority Data

Sep. 21, 2017 (EP) .................................. 17382630

(51) Int. Cl.
*H04L 9/40* (2022.01)
*G06F 21/33* (2013.01)
(Continued)

(52) U.S. Cl.
CPC .......... *H04L 63/0823* (2013.01); *G06F 21/33* (2013.01); *G06Q 10/10* (2013.01);
(Continued)

(58) Field of Classification Search
None
See application file for complete search history.

(56) References Cited

U.S. PATENT DOCUMENTS 6,671,805 B1 * 12/2003 Brown ................. H04L 9/3247
713/180
2001/0027523 A1   10/2001 Wakino
(Continued)

FOREIGN PATENT DOCUMENTS

CN      104782086 A    7/2015
EP        2846500 A1    3/2015
(Continued)

OTHER PUBLICATIONS

International Search Report for PCT/ES2018/070565 issued by the European Patent Office and dated Feb. 12, 2019.
(Continued)

*Primary Examiner* — Michael Pyzocha
(74) *Attorney, Agent, or Firm* — Hassan Abbas Shakir; Shakir Law PLLC

(57) ABSTRACT

The object of the invention relates to a method in which a telecommunications operator or an e-delivery provider can send notices by email to one or a number of recipients, certifying the content of the notice and with a link to a proxy server of a CA (certification authority) who will verify the digital certificate of the recipient and their identity.

2 Claims, 3 Drawing Sheets

(51) Int. Cl.

| | |
|---|---|
| *H04W 4/14* | (2009.01) |
| *H04W 12/06* | (2021.01) |
| *G06Q 10/10* | (2023.01) |
| *H04L 51/42* | (2022.01) |
| *H04L 51/234* | (2022.01) |
| *H04L 67/56* | (2022.01) |
| *H04L 67/02* | (2022.01) |

(52) U.S. Cl.
CPC ............ *H04L 51/234* (2022.05); *H04L 51/42* (2022.05); *H04L 63/123* (2013.01); *H04L 67/56* (2022.05); *H04W 4/14* (2013.01); *H04W 12/06* (2013.01); *H04L 67/02* (2013.01)

(56) References Cited

U.S. PATENT DOCUMENTS

| | | | |
|---|---|---|---|
| 2002/0069123 A1 | 6/2002 | Soderlind et al. | |
| 2002/0078159 A1* | 6/2002 | Petrogiannis | G06F 21/64 709/206 |
| 2005/0188204 A1* | 8/2005 | Rice | H04L 9/3263 713/176 |
| 2006/0100888 A1* | 5/2006 | Kim | H04L 63/0823 705/67 |
| 2007/0208944 A1* | 9/2007 | Pavlicic | H04L 9/3247 713/176 |
| 2010/0161993 A1 | 6/2010 | Mayer | |
| 2010/0325005 A1 | 12/2010 | Benisti et al. | |
| 2012/0072837 A1* | 3/2012 | Triola | G06Q 10/10 715/268 |
| 2012/0330848 A1 | 12/2012 | Feldbau | |
| 2013/0212038 A1 | 8/2013 | Marko | |
| 2013/0246289 A1 | 9/2013 | Ryu et al. | |
| 2013/0254111 A1 | 9/2013 | Gonser et al. | |
| 2014/0115073 A1 | 4/2014 | Sapena Soler | |
| 2014/0222695 A1* | 8/2014 | Yang | G06Q 10/10 705/311 |
| 2015/0074006 A1 | 3/2015 | Soler | |
| 2015/0131797 A1* | 5/2015 | Ashley | H04L 9/3263 380/270 |
| 2015/0134561 A1 | 5/2015 | Ashley | |
| 2015/0341353 A1 | 11/2015 | Zhou | |
| 2016/0065567 A1* | 3/2016 | Aggarwal | H04L 63/062 713/175 |
| 2019/0005268 A1* | 1/2019 | Gupta | G06F 21/64 |

FOREIGN PATENT DOCUMENTS

| | | |
|---|---|---|
| EP | 3188435 A1 | 7/2017 |
| JP | 2016500961 A | 1/2016 |
| JP | 2017517956 A | 6/2017 |

OTHER PUBLICATIONS

Written Opinion for PCT/ES2018/070565 issued by the European Patent Office and posted Mar. 28, 2019 to Patentscope at www.WIPO.int.

International Preliminary Report on Patentability for PCT/ES2018/070565 issued by the International Bureau of WIPO dated Mar. 24, 2020.

Extended European Search Report for European Patent Application EP17382630 issued by the European Patent Office dated Mar. 26, 2018.

Office Action in European Patent Application EP17382630 iissued by the European Patent Office dated Feb. 14, 2020.

International Search Report for PCT/ES2018/070562 issued by the European Patent Office and dated Jan. 16, 2019.

Written Opinion for PCT/ES2018/070562 issued by the European Patent Office and posted Mar. 28, 2019 to Patentscope at www.WIPO.int.

International Preliminary Report on Patentability for PCT/ES2018/070562 issued by the International Bureau of WIPO dated Mar. 24, 2020.

Extended European Search Report for European patent application EP 17382631 issued by the European Patent Office dated Mar. 23, 2018.

Office Action in European patent application EP17382631 issued by the European Patent Office dated Feb. 14, 2020.

Office Action in U.S. Appl. No. 16/122,109 issued by the United States Patent & Trademark Office dated Mar. 23, 2020.

Patent Search Record Information for Chinese patent application 2018800658385 issued by the Chinese State Intellectual Property Office and dated Aug. 30, 2021 in Global Dossier, in English.

Second Office Action for Chinese patent application 2018800658385 issued by Chinese State Intellectual Property Office and dated Feb. 16, 2022 in Global Dossier, English translation provided.

First Office Action for Chinese patent application 2018800658385 issued by Chinese State Intellectual Property Office and dated Sep. 7, 2021 in Global Dossier, English translation provided.

Written Opinion for Japanese patent application 2020-51640 prepared by the Japanese Patent Office and dated Nov. 10, 2022, English translation provided.

Decision for Refusal for Japanese patent application 2020-51640 prepared by the Japanese Patent Office and dated Mar. 7, 2023, English translation provided.

Written Opinion for Korean patent application 10-2020-7010268 prepared by the Korean Intellectual Property Office and dated Jul. 5, 2022 in Global Dossier, English translation provided.

Request for the Submission of an Opinion for Korean patent application 10-2020-7010268 prepared by the Korean Intellectual Property Office and dated Jan. 5, 2022 in Global Dossier, English translation provided.

Office Action for European patent application 17382630.6 prepared by the European Patent Office and dated Jan. 22, 2022.

* cited by examiner

PLATFORM AND METHOD OF CERTIFICATION OF AN ELECTRONIC NOTICE FOR ELECTRONIC IDENTIFICATION AND TRUST SERVICES (EIDAS)

CROSS-REFERENCE TO RELATED APPLICATION

This application is a continuation application of and claims priority to U.S. Ser. No. 15/944,230, which was filed Apr. 3, 2018 and is pending U.S. Ser. No. 15/944,230 is hereby incorporated by reference in its entirety for all purposes. U.S. Ser. No. 15/944,230 claims priority to European Patent Application No. 17382630, filed on Sep. 21, 2017. European Patent Application No. 17382630 is incorporated by reference herein in its entirety for all purposes.

DESCRIPTION

Object of the Invention

The object of the invention is framed within the field of technologies of information and communication.

More specifically, the method described here is aimed at applications for certifying intervening parties, send, receipt and content of electronic documents.

BACKGROUND OF THE INVENTION

The world of digital certification and notice has already been developing for a number of years now, however, there is general confusion among the actors of the world of digital certification between the certification authorities, the digital companies, the e-delivery providers, the certification processes, the processes that are certifiable and the different methods. In addition, the digitally-signed documents only include information on who signs them and their content is maintained unmodified, but they do not contain the information on their sending, their delivery, their acceptance or rejection if other digital means are used to accept and to digitally sign a notice.

The most common method for notice has been notice of appearance and concentrating all actions using one single CA for the certificates, the signatures and doing all of this in one single location. In itself, it is the method which a priori may be the simplest, but the problem emerges that the number of required certificates, locations where to sign and where, when preparing a notice of appearance, digital presence or periodic access is required to avoid missing notifications. In Spain alone, there are around 80,000 digital entities to which access is obligatory if you wish to operate nationally.

The previously cited drawbacks must be resolved and allow any digital certificate to be used which is configured in the proxy CA such that the process can be initiated at any time both by email and by SMS; there being a record of all the steps taken and such that it can be demonstrated at any time who the actors of the notice process are and when and to what point the notice process and notice has progressed.

An electronic trust service consists of:
  The creation, verification and validation of electronic signatures, electronic stamps or electronic time stamps, certified e-delivery services and certificates relating to these services.
  The creation, verification and validation of certificates to authenticate websites.
  The preservation of signatures, stamps or electronic certificates relating to these services.

In this sense, an electronic identification and trust service (eIDAS) framework must be established, by means of implementing eIDAS, the electronic identification and trust services for electronic transactions are supervised. eIDAS regulates the electronic signatures, the electronic transactions, the bodies involved and their inclusion processes to provide a safe way for users to conduct business online and electronic transfer of funds or transactions with public services. Both the signatory and the recipient have access to a higher level of convenience and safety. Instead of depending on traditional methods, such as email, fax services or appearing in person to present paper documents, now cross-border transactions can be carried out, for example using "1 click" technology.

Therefore, the implementation of eIDAS establishes standards for which electronic signatures, qualified digital certificates, electronic stamps, time marks and other tests for authentication mechanisms allow electronic transactions with the same legal entity as the transaction carried out on paper.

SUMMARY OF THE INVENTION

In a first aspect of the invention, there is a platform for certification of transactions such as notices, a platform which is implemented by means of a telecommunications operator, making use of a series of interconnected services. The platform can thereby have a configuration such that it implements a notice server which implements electronic notice email systems, an email management server with evidence collection, a database server stores the content of the original email, a time stamp server, a server for generating evidence collected during the notice process, a validation server responsible for ensuring the identity of the recipient by means of using a digital certificate contained in the browser of the receiver, a certified message server, responsible for sending messages and a server for generated documents intended for storing the electronic notice certificates generated by the document generation server.

It should be mentioned that as the platform is connected to a telecommunications operator (or communications operator throughout this document) and preferably implemented in the same, it allows certification tasks to be carried out without the need for network entities external to the communications operator.

In a second aspect of the invention, the object of the invention relates to a method in which a telecommunications operator or an e-delivery provider can send notices by email to one or a number of recipients, certifying the same using a link to a proxy server of a CA (certification authority) who will verify the digital certificate of the recipient and their identity, resending the communication to a notice server where the notice can be verified, accepted or rejected and generate proof of the transaction as a communications operator where the notice, the notifying entity, the certificate issued by the CA relating to the notifying entity and all the transactional data required to demonstrate the transaction are found.

The object of the invention provides a method for notice and electronic notice using robust identification at both ends; identification of the client by means of a digital certificate of signatures which the CA will check and identification of the provider by means of contracting the service to the e-delivery provider, the communications or telecommunications operator, certifying all the evidence of the electronic transactions.

According to what was previously stated, the object of the invention has two aspects, a first aspect of the object of the invention being a platform for the certification of an electronic notice object of the invention, while the second aspect is a method which allows a certified electronic notice to be generated with the characteristic of using a proxy of a third party certification authority to verify the identity of the contracting party using the digital certificate inserted into the browser of the contracting party, certifying the entire process by means of a telecommunications operator or a telecommunications operator which can also be called a telecommunications operator or electronic telecommunications operator, this always being an e-delivery provider. Lastly, the client of the transmitting electronic telecommunications operator receives a certificate according to which the notice has or has not been made, including the original email, the notice, date, time and traceability of the same, a unique transaction number and the CA certificate with the identification data contained in the digital certificate contained in the browser which unequivocally identifies the contracting party.

The method of the invention can be used for notices and can be implemented using email or SMS messages.

BRIEF DESCRIPTION OF THE DRAWINGS

In order to complement the description being made and with the object of helping to better understand the characteristics of the invention, in accordance with a preferred practical embodiment thereof, said description is accompanied, as an integral part thereof, by a set of figures where, in an illustrative and non-limiting manner, the following has been represented.

PREFERRED EMBODIMENT OF THE INVENTION

Figure 1:
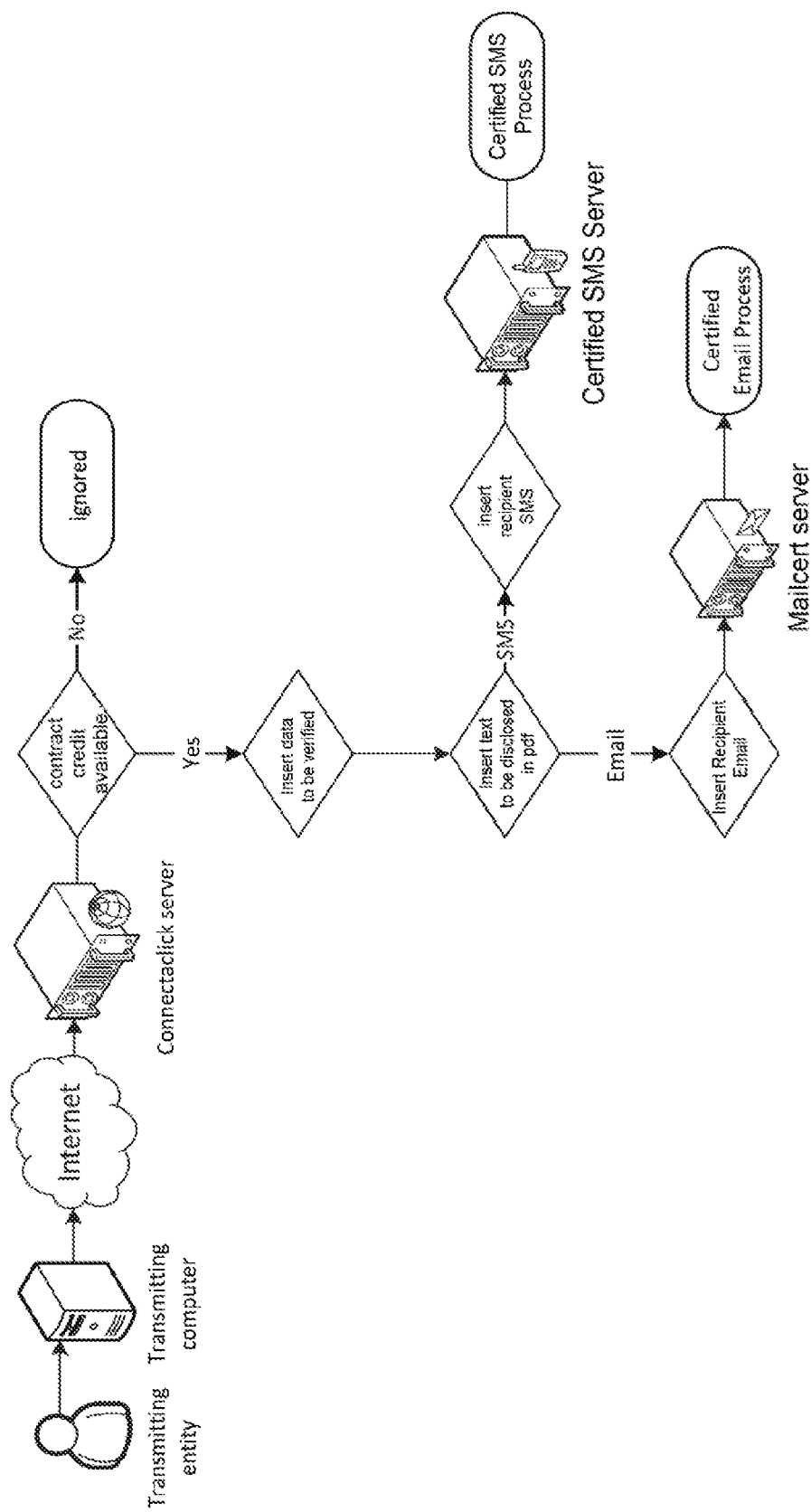
FIG. 1 shows a flow diagram where an embodiment of the method of the invention is represented aimed at an electronic transaction relating to an electronic notice, the process being initiated by the transmitting entity to introduce the recipient data and the data to verify the electronic notice.

The method for the certification of an electronic notice object of the invention can be implemented in a platform associated with a telecommunications operator also object of this invention and shown in its incorporation in the invention in FIG. 1; a platform which is accessible to a receiving entity or receiver and a transmitting entity or transmitter; to the receiving entity through a receiver or a receiving device (such as a smartphone or a computer of a receiver), and to the transmitting entity through a transmitter or a transmitting device (such as a computer or similar device of a transmitter) and a series of servers interconnected to each other, said servers can be:

a notice server called a Connectaclick server, it is called this as it is a solution implementing electronic notice systems such as electronic notice systems using email, web and SMS in an indistinct manner. The notice server being closely connected to the telecommunications operator or being part of the same.

an email management server called Mailcert, a server which allows email to be managed with evidence collection from said emails, evidence which can include amongst others: the headers, the body and its attachments.

a Mailcert database server which stores the content of the original email, including headers, body and attachments, the log portions corresponding to the sending and the resolution information of the recipient email server. It stores the historic data.

a time stamp server or time stamp unit (TSU), a time stamp system implemented in-situ provided by a CA for the time stamping of documents, preferably PDFs, evidence generated by the certification systems. This server is preferably located in the infrastructure of the telecommunications operator but in certain circumstances, if required, it can be an entity of a third party and therefore be physically located outside of the infrastructure of the telecommunications operator.

an evidence generation server called a TSA server, a server generating documents, preferably in PDF format which comprise evidence resulting from the compilation of said evidence during the notice process.

a validation server called a CA validation proxy which is a server responsible for ensuring the identity of the recipient by means of using a digital certificate contained in the browser of the recipient.

a certified message server responsible for sending certified messages from the transmitter of the notice to the receiver of the notice, preferably SMS, to the GSM network in the case of opting for carrying it out by means of SMS.

a generated documents server responsible for storing bulks of generated electronic notice certificates.

Figure 2:
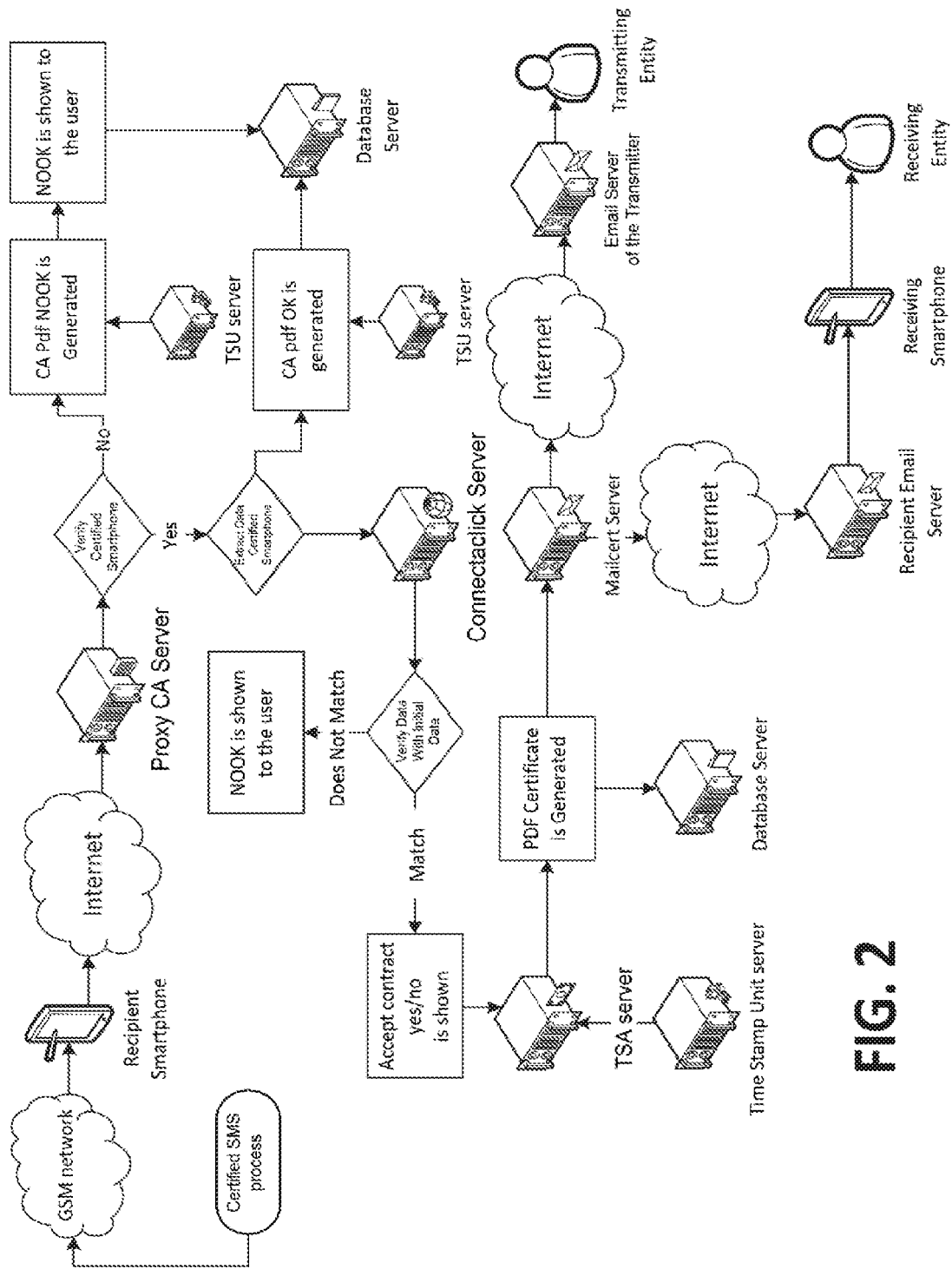
FIG. 2 shows a flow diagram where an embodiment of the method of the invention is represented aimed at an electronic transaction relating to an electronic notice, the process being initiated by means of a certified SMS or SMS.
Figure 3:
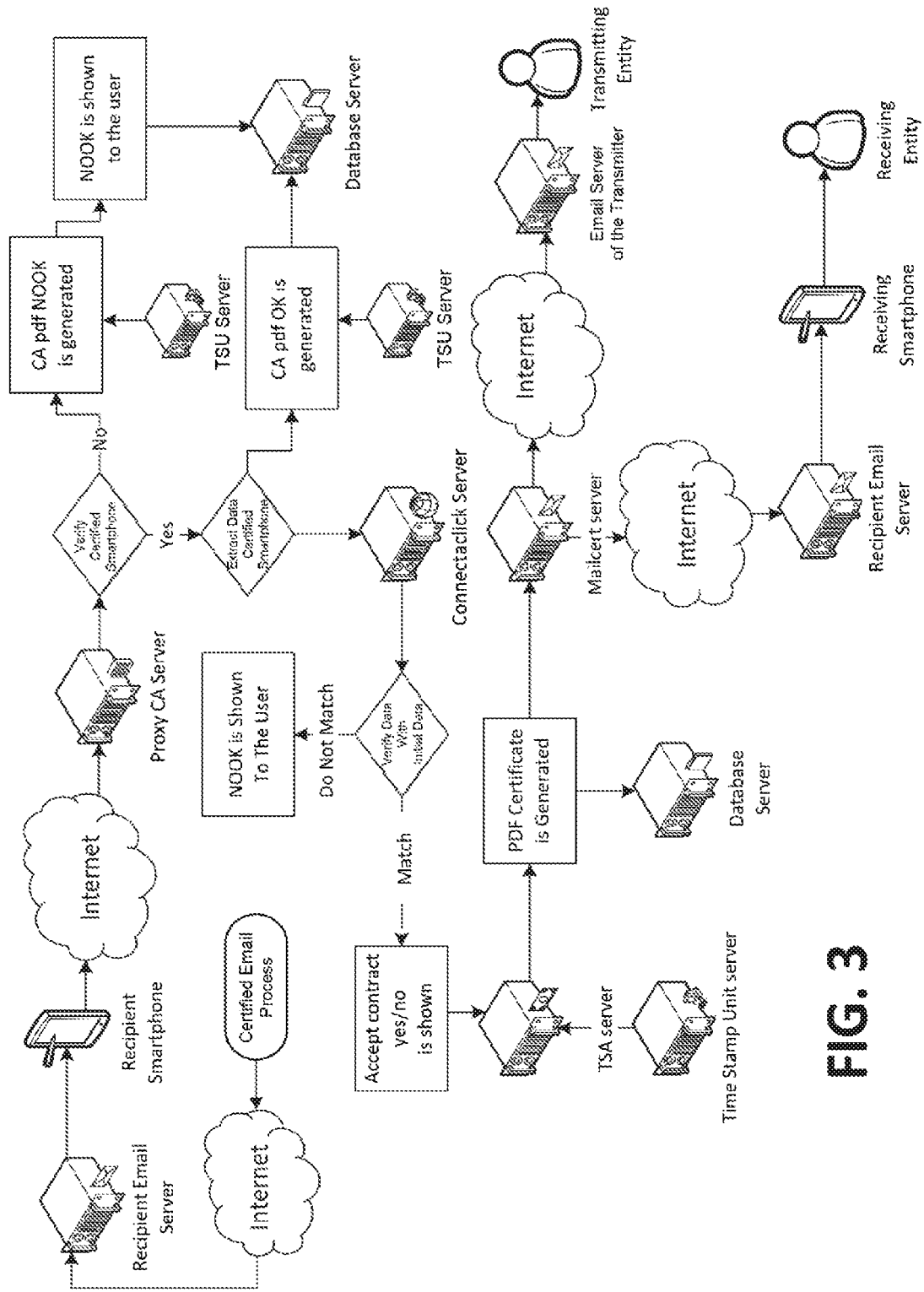
FIG. 3 shows a flow diagram where an embodiment of the method of the invention is represented aimed at an electronic transaction relating to an electronic notice, the process being initiated by means of a certified email or an email.

The method for the certification of an electronic notice object of the invention has two possible embodiments distinguished from each other by using SMS messages, as shown in FIG. 2, or emails, as shown in FIG. 3, that is to say, certified SMS or a certified email (hereinafter certified email).

The method of the invention thereby allows the generation of a certified electronic notice to be carried out, where a transmitting entity, by means of an electronic transmitting device, such as their computer, accesses the notice server (Connectaclick server) by means of access to a data network such as the internet, being identified as a transmitter.

Once the user is authenticated, the data of the client to be verified, the electronic transaction that they wish to execute and the telephone number or email address of the receiver who is called the receiver or recipient throughout this document are introduced. The selection of one or other type of message will determine the steps to be followed such that:

if a telephone number is introduced, an SMS will be sent by way of a certified SMS server and the process will be initiated with certified SMS, as emerges from FIG. 2.

if an email is introduced, a certified email will be sent by way of the Mailcert server and the process will be initiated with a certified email, as emerges from FIG. 3.

The process with certified SMS shown in FIG. 2 is initiated when the receiving electronic device of the recipient receives the message which has access capability and data communication such as a smartphone, said message contains a URL (internet address) which links to a proxy server of a CA server by way of which all the communication with the rest of the servers is carried out.

The process with certified SMS continues with access on the part of the recipient to said URL where the proxy server of the CA requests a digital certificate, from among the possible content in the browser of the receiving device in order to be used in the transaction.

If it does not have a digital certificate, it is not valid or it cannot access the same, the proxy server of the CA finalizes the process and shows that the process cannot continue, generating a non-compliance file called "CA pdf NOOK" and which is preferably in PDF format which will be stored on the generated PDF server; optionally, a time stamp from a TSU server can be added to said non-compliance file (CA pdf NOOK). If it has the certificate, a series of data are extracted which contain the certificate for its subsequent verification, generating a compliance file called "CA pdf OK" using said data, at the same time and as occurs with the non-compliance file, optionally a time stamp from a TSU can be added and it is subsequently stored in the generated PDF server.

In this way, when the data contained in the certificate of the browser match the data initially introduced, the notice to be signed is then shown. If the recipient does not accept having seen the notice, it is shown that the recipient has not accepted as seen and the process is finalized, whereas if they accept having seen the notice, they are asked for an email address of the recipient to send a copy for the recipient and the session is finalized with the recipient.

Once the session with the recipient is finalized, the evidence generation server, TSA server, generates a certificate of the transaction by means of compiling all the data relating to the transmission of data on the internet, the notice itself and its content, the generated PDFs of the proxy CA and any transactional data of the operation used. Once generated, the resulting certificate is signed with the digital signature of the telecommunications operator and a time stamp by way of a time stamp server (TSU server).

The resulting certificate, once stamped, is sent to the Mailcert server responsible for transmitting the email, sending two copies of the certificate of the notice already seen and all the generated evidence, one to the transmitting entity and another to the receiving entity which will be received by the respective email servers in order to be collected by their respective users.

In some embodiments in which the method uses certified email, as shown in FIG. 3, the method is similar and is initiated when an incoming email server of the recipient receives the certified email initially sent, where said certified email can contain the notice, but which contains a URL (internet address) which points to a proxy server of a CA by way of which all the communication with the rest of the servers is carried out. The process with certified email continues when the recipient, receiver, accesses their email by way of their smartphone or computer and accesses the URL included in the email where the CA proxy server asks them what digital certificate contained in the browser of the smartphone or computer is going to be used in the transaction. If it does not have or does not have access to them, the proxy CA server shows that the process cannot continue and generates a CA pdf NOOK file in PDF format which will be stored on the generated documents server to which a time stamp (TSU) can be added. If the browser has the certificate, the data that it contains for its subsequent verification are extracted, generating a CA pdf OK file with the data, a time stamp from a TSU server can be added and will be stored on the generated PDF server.

The process continues when the receiving user accesses the Connectaclick server by way of the proxy CA where it is verified that the data contained in the certificate of the browser match the data initially introduced and the notice will be shown. If the recipient does not accept having seen it, it is shown that they have not accepted and it is finalized. If they accept having seen the notice, they are asked for the email to send a copy and the session with the recipient is finalised.

Once the session with the recipient is finalized, the evidence generating server prepares the certificate of the transaction with all the internet data, the notice, the generated PDFs of the proxy CA and any transactional data of the operation used. Once completed, the resulting certificate is signed with the digital signature of the telecommunications operator and a time stamp by way of a time stamp server (TSU server). The generated certificate is sent to a Mailcert server responsible for transmitting the email, sending two copies of the certificate of the notice and all the generated evidence, one to the transmitting entity and another to the receiving entity which will be received by the respective email servers in order to be collected by their respective users.

According to the foregoing, the method object of the invention provides the advantage of the digital evidence and certificates used being able to come from different CAs or certification entities, in possible alternative embodiments, a second CA can be used, being a provider of the proxy CA server and a third e-delivery provider who is responsible for ultimately packaging all the evidence of the notice, generating the certificate of the entire process of the notice.

The invention claimed is:

1. A method of certifying an electronic notice by a single telecommunications operator without a need for additional network entities external to the single telecommunications operator, the electronic notice originating from a transmitter and to be shown to a recipient in order to be signed when an identity of the recipient is verified, the method comprising the steps of:

accessing, by the transmitter, a notice server;

introducing data of the recipient, the data being selected from an email address of the recipient or a telephone number of the recipient;

selecting the telephone number or the email address;

sending to the recipient an SMS using a certified SMS server or a certified email using an email management server, wherein both the certified SMS and the certified email comprise at least one URL linking to a proxy server of a CA (certification authority) server through which communication is carried out;

accessing, by the recipient, the URL and a selection of a digital certificate in a browser to be used to sign the notice;

accessing, by the recipient, the notice server using the proxy server of the CA to verify data contained in the digital certificate;

showing, by the notice server, a content of the electronic notice to be signed by the recipient only when data contained in the digital certificate verifies the identity of the recipient;

generating, by the evidence generation server, a transaction certificate with all the network data, the notice, the documents generated by the proxy server of the CA, and transactional data associated with the proxy server;

signing the transaction certificate with a digital signature of the telecommunications operator;

applying, by a time stamp server, time stamps to the transaction certificate once the transaction certificate has been signed;

sending a first copy of the signed and stamped transaction certificate and all generated evidence to the transmitter and sending a second copy of the signed and stamped transaction certificate and all generated evidence to the recipient to be collected by their respective users.

2. The method according to claim 1, the method further comprising the steps of wherein when the digital certificate or access to the digital certificate is not possible;

determining by the proxy server of the CA that the process cannot continue, generating a non-compliance file by the proxy server, storing the non-compliance file in the generated documents server, and time stamping of the non-compliance file in the generated documents server.

\* \* \* \* \*